United States Patent
Pavlic et al.

(10) Patent No.: US 8,484,086 B2
(45) Date of Patent: Jul. 9, 2013

(54) PAYMENT TERMINAL DEVICE FOR PAYMENT DATA EXCHANGE

(75) Inventors: Bogdan Pavlic, Zagorje (SI); Matjaz Terpin, Zagorje (SI); Aleksander Polutnik, Zagorje (SI)

(73) Assignee: Ultra Prozvodnja Elektronskih Naprav D.O.O., Zagorje (SI)

( * ) Notice: Subject to any disclaimer, the term of this patent is extended or adjusted under 35 U.S.C. 154(b) by 1464 days.

(21) Appl. No.: 10/510,990

(22) PCT Filed: Apr. 16, 2002

(86) PCT No.: PCT/IB02/01223
§ 371 (c)(1),
(2), (4) Date: Jun. 15, 2005

(87) PCT Pub. No.: WO03/088165
PCT Pub. Date: Oct. 23, 2003

(65) Prior Publication Data
US 2005/0228720 A1    Oct. 13, 2005

(51) Int. Cl.
*G06Q 30/00* (2006.01)
(52) U.S. Cl.
USPC ...... 705/26; 705/1; 705/17; 705/42; 235/375; 235/380; 235/382; 235/437; 379/114; 379/91; 379/191; 379/249; 379/93; 379/144; 379/88; 379/196; 379/207; 379/67; 379/76; 379/110
(58) Field of Classification Search
USPC ......................................................... 705/26
See application file for complete search history.

(56) References Cited

U.S. PATENT DOCUMENTS

| 5,577,100 | A  | * | 11/1996 | McGregor et al. | 455/406 |
| 5,714,741 | A  | * | 2/1998  | Pieterse et al. | 235/380 |
| 7,249,110 | B1 | * | 7/2007  | Kimura et al.   | 705/67  |
| 2002/0126885 | A1 | * | 9/2002 | Mennie et al.  | 382/135 |
| 2003/0145316 | A1 | * | 7/2003 | McKinlay et al.| 717/173 |

FOREIGN PATENT DOCUMENTS

| EP | 0 848 360 A1 | 6/1998 |
| EP | 1 107 197 A2 | 6/2001 |
| EP | 1 120 761 A2 | 8/2001 |

(Continued)

OTHER PUBLICATIONS

Eckhardt, David A. An Internet-style approach to managing wireless link errors. 2002. Carnegie Mellon University, UMI Dissertations Publishing.*

Notification of Transmittal of The International Search Report or the Declaration; International Application No. PCT/IB 02-01223; International Filing Date Apr. 16, 2002.

*Primary Examiner* — F. Zeender
*Assistant Examiner* — Fawaad Haider
(74) *Attorney, Agent, or Firm* — Antonelli, Terry, Stout, & Kraus, LLP.

(57) ABSTRACT

Disclosed is a terminal device (10) for payment data exchange comprising interfaces for coupling to a point of sale devices (26), to a mobile phone (14), and to a payment center (1). The payment data exchange is performed on two different ways. In a first way from the payment terminal device (10) via the mobile phone (14) and the mobile voice network (5) to the authorization center (1) or, vice versa, from the payment center (1) via the mobile voice network (5) and the mobile phone (14) to the payment terminal device (10), wherein the payment data are transferred between the payment terminal device (10) and the mobile phone (14) on voice information. On the second way the data are transferred directly from the terminal device (10) via e.g. the network (5) to the authorization center (1) and, vice versa, from the payment center (1) via the network (5) to the payment terminal device (10).

18 Claims, 2 Drawing Sheets

FOREIGN PATENT DOCUMENTS

Figure 1:
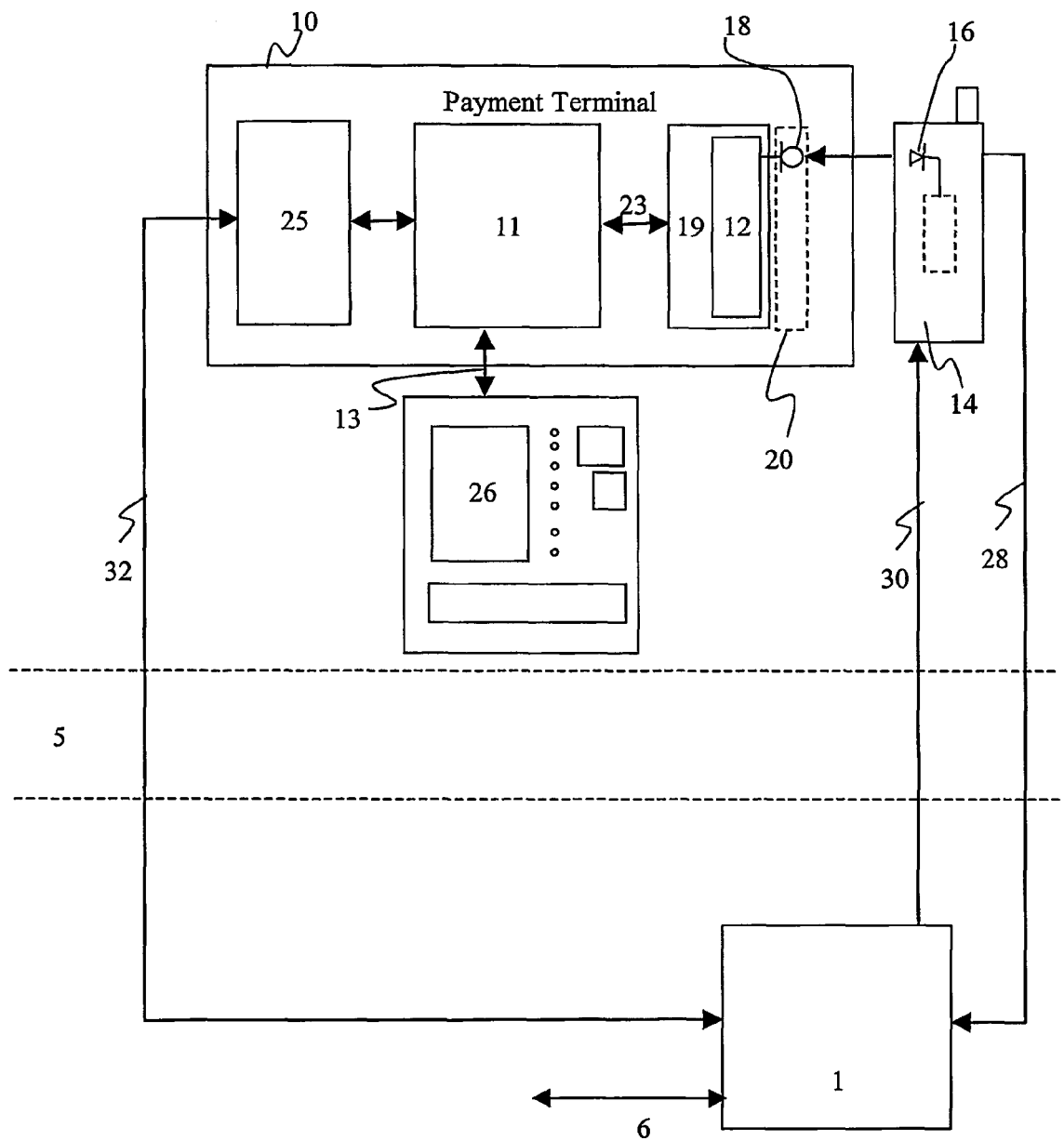

| | | |
|---|---|---|
| JP | 05-153265 | 6/1993 |
| JP | 2001-160108 | 6/2001 |
| JP | 2002-58443 | 2/2002 |
| WO | WO 01/54087 A1 | 7/2001 |

* cited by examiner

PAYMENT TERMINAL DEVICE FOR PAYMENT DATA EXCHANGE

The present invention relates to a system for financial transaction data (authentication, authorisation and payment data) exchange between a point of sale device, e.g. vending machine etc. and a payment centre or authorisation centre (an entity responsible for authentication, authorisation and corresponding payment and settlement procedures of the transaction), and to a payment terminal device to be used in a payment system.

Mobile telephony is booming throughout the world and provides many recently developed applications in data communication. One of the hottest new services is payment through a mobile phone which is generally called "m-payment". There are available m-payment solutions, most of which are based on WAP (Wireless Application Protocol) technology which promises to bring all the benefits of internet to a mobile phone. Other solutions use calls to a special payment terminal, those calls being activated either from an authorisation centre or a subscriber or user. But there are severe obstacles preventing faster acceptance of m-payment, especially in a non-internet domain, which are the costs of the known payment terminals with regard to their acquisition as well as operating costs. Inter alia, this is due to the fact that each payment terminal has to include a fairly sophisticated communication interface which has to cover all the different, possible new and currently established standards of data communication in mobile telephone networks and phones. All known systems on the market require some kind of presenting the mobile phone number (or its alias) to the payment terminal, all of which complicates the payment procedure. There were some solutions on the market utilising a barcode on, or in proximity of a phone for to allow the payment terminal to read it and start an authorisation process.

Therefore, it is an object of the invention to provide a payment terminal to be used in a payment system which is able to prevent the problems arising from the different mobile phone standards with regard to coupling a mobile phone to a payment terminal device.

It is desirable to have a terminal that provides a very simple, fast and easy to use tool.

It is further desirable to have a simple, fast and reliable system with a minimum coupling between the mobile terminal device and the payment terminal device.

This object is solved by the payment terminal device according to claim 1.

Accordingly, a payment terminal device for coupling to a point of sale device, a mobile phone and a payment centre is provided. The payment terminal device comprises first and second interface means, and data processing means. The first interface means is for releasably coupling said mobile phone to the payment terminal device to transfer data information between said mobile phone and said payment device. The data information can be sound or voice data information. The second interface means is for coupling said payment terminal device and said payment centre, to transfer data information between said payment terminal device and said payment centre. The coupling between said payment terminal and said payment centre can be releasable. The data processing means is coupled to said first and said second interface means for processing data received from said first and said second interface means and for generating data to be sent to said first or said second interface means.

Said first interface means comprises coupling means for coupling said interface means to said mobile phone. Said coupling means is for transferring data between said mobile phone and said processing means via said coupling means and said first interface means or vice versa.

The second interface enables the payment device to contact the payment centre by itself, but also to inform the provider of the point of sale device if e.g. a maintenance is necessary. The second interface also has the advantage that the number of direct contacts between the mobile telephone and the payment terminal can be minimised. The second interface can releasably connect the payment centre. Further, the second interface can comprise for instance a wireless communication modem, a wired communication modem such like a PSTN modem, an ISDN modem, cable modem or a GSM, or UMTS modem for coupling to the related networks in order to provide a second direct connection from the payment terminal device to the payment centre. Said second interface means comprises means for converting data transferred between said second interface device and said payment centre into data being processable by said processing means and said payment centre and vice versa.

The first interface helps enabling an authorisation process. It is not necessary to transfer the whole authorisation data via the first interface, but only a part of it, which simplifies the procedure for the user. It is one of the tasks of the first interface to help the payment terminal to determine the (phone) number, or other identification data of the mobile phone and the number of the payment terminal.

The second interface device can be used for different tasks. One task can be, to simplify the use of the payment terminal. One problem of the system is, that the user (or the mobile phone of the user), the point of sale (POS) device in proximity to the mobile telephone of the user, and the amount of the payment transaction have to be identified. The identification of the phone or the user can be done e.g. by an automatic call number transfer as in the case of a caller identification as known e.g. from mobile phone calls, or by a query of the SIM (Subscriber Identification Member) card of the mobile telephone. The identification of the phone of the user can be executed very simply or even automatically.

The identification of the POS device can be executed e.g. by transferring an identification code from the terminal device to the payment centre. Preferably, said identification can be performed by a circle transmission e.g. from the payment centre via the payment terminal and the mobile phone back to the payment centre or vice versa. The circle transmission can also be started from the payment terminal device or from the mobile phone. A circle transmission can also be used to determine the close proximity of the mobile terminal device to the payment terminal device or the point of sale device.

Another task can be to minimise the communication time between the mobile phone and the payment centre. A reduced communication time has multiple advantages. The shorter the communication time between the mobile telephone device and the payment terminal is, the less errors can occur during transmission, the shorter is the time the customer has to press the mobile phone device to the payment terminal, and last not least the less the communication costs for the user are. According to the selected design of the payment terminal device, the payment terminal device or the payment centre are initiating the connection between the payment centre and the payment terminal device.

Preferably, said data transfer between said mobile phone and said payment terminal device is a one-way data transfer. Standard procedures and terminals utilise only one data connection between the mobile terminal device and the payment terminal. This procedure includes that the whole communication between a payment terminal device and the payment centre can be observed by the user. According to one embodiment of the present invention, the authentication of the transfer can be performed via a different transmission channel than the request for the payment. This enables a safer and more reliable payment transaction, as at least one connection between the payment terminal and the payment centre is not observable by a user. Another advantage of a one-way data transfer arises from the fact that the distance between the loudspeaker and the microphone of different mobile phones is not fixed and can vary e.g. between 11 and 5 centimetres. A one-way transmission between the mobile phone device and the payment terminal can economise an adaptation mechanism to adapt the distance between the microphone and the loudspeaker of the payment terminal device according to different types of mobile phones. Another advantage of a one-way transmission is that a user more likely knows the position of the loudspeaker, than the location of the microphone in his mobile phone device. Another advantage of the one-way transmission is a hygienic aspect, that the end of the phone not coming in close contact with the facial skin of the user is placed on or close to the payment terminal device.

Conveniently, said first interface means comprises a modem. Said modem is coupled to said coupling means for converting the data transferred between said mobile phone and said processing means via said coupling means and said first interface device. A modem can be used, to optimise the data transfer between the processing means and said mobile phone. Said modem may even be utilised to adapt the data to be transferred to the mobile phone type actually used. The modem can be used to modulate data in accordance with said coupling means.

Advantageously, said data transferred between said modem and said mobile telephone are sound data or acoustic data. The great advantage of this embodiment of the present invention is the transfer of payment data between the mobile phone and the payment terminal device using voice data information which is the only standard to be take into account by all phone makers. The acoustic data transmission helps to reduce strongly the complexity of the communication interface in the payment terminal device and the costs connected thereto, as the acoustic coupler is a well known data transfer method, so no difficulties are to be expected in the realisation of the payment terminal. Voice data information or voice information is the specific form of useful or wanted information which is known to be transferred and exchanged in the voice channel of the mobile voice network.

The payment terminal device of the invention is for coupling to a point of sale device, vending machine etc., a payment centre and comprises interface means for releasable coupling the payment terminal device to the mobile phone.

Independent of the expense for a second interface, the user benefits from a simplified operation of the system and the payment process. The second connection between the payment terminal and the payment centre provides the advantages of economising an input of a PIN or telephone number for authentication. Further a dialling process can be economised, if the user enables abbreviated dialling for the number of the payment centre. Even the input of a sum may be economised, if the payment terminal uses a two-way interface to the POS. With a two-way POS interface, a user may simply select the desired service or product on the POS, press the abbreviated dialling key on his phone, press the mobile phone against the payment terminal, and wait for the delivery of the service of product. This procedure enables even a fast and simple one hand operation of the payment terminal. This would enable in the simplest case two-button one-hand operation for the payment of the POS. Preferably, the user may press a "use payment terminal" button on the POS device or the payment terminal device. The connection to the payment centre can be terminated by the payment centre, so the user does not even have to put down the receiver. If desired, the method may be extended with additional "confirmation" buttons to be pressed prior to the payment process.

Preferably, the coupling means has an acoustic coupler for transferring voice data information in the form of acoustic signals between the mobile phone and the coupling means and vice versa, i.e. the voice data information is transferred as voice itself or voice as a carrier of information in the frequency band of human voice. The acoustic coupler allows coupling of the payment terminal device to any type of mobile telephone which is currently used and which might be used in the future without any adaptation of the different mobile phones themselves. Generally, the shape of the acoustic coupler should enable the mobile phone microphone to fit with the speaker and vice versa in a way that allows operability even in a noisy condition or environment.

The use of an acoustic coupler has the additional advantage that the data connection between the mobile phone and the payment terminal is universal, and can be used by any phone independently of connectors, manufacturer design, appropriate interfaces and the like. Due to the low amount of data to be transferred between the mobile phone and the terminal device, the relative low data transfer rate of an acoustic coupler is sufficient.

Preferably, said acoustic coupler has a microphone for coupling to a speaker of the mobile phone. This design has the main advantage that from the providers point of view, the mobile telephone of the user is only connected to the payment centre, and the payment centre can easily be equipped with a fraud protection system.

Advantageously, said acoustic coupler has a loudspeaker for coupling to a microphone of the mobile phone. This design has the main advantage that from the providers point of view, the mobile telephone of the user is only connected to the payment device, and acts only a s relay station for a part of the information used for authentication.

The data, encrypted or not, transmitted through the mobile phone voice channel can easily use any mobile phone standard. The system can be used with analogue mobile phone systems, with GSM or with UMTS or any other following mobile phone system. The data modulation can either be DTMF or any other data modulation which can be transmitted through such a voice channel.

The two connections between the payment terminal and the payment centre enable a very simple system architecture. In a very simple embodiment of the present invention, the payment terminal acts only as a relay station between the mobile phone and the payment centre and the mobile phone end the point of sale (POS) device. In a first step the payment terminal is only used to confirm that the mobile phone is in near proximity of the POS device, in the second step the POS device transfers information e.g. price of a selected product to the payment centre, and in the last step e.g. by user input the payment is executed, and the product is issued.

Advantageously, a distance between a microphone and a speaker of the acoustic coupler may be adjustable in order to adapt the acoustic coupler to different types of mobile phones.

In preferred embodiments of the invention, there are several additional options for coupling of the payment terminal to the mobile phone.

A first advantageous coupling between the payment terminal and the mobile phone is the wired option, wherein the coupling means has electrical plug connector means for electrical coupling to a plug connector of the mobile phone in order to exchange information or voice data information in the form of electrical signals between the mobile phone and the coupling means. The plug connector means can have a plurality of different plug connectors for coupling to plug connectors of different types of correspondingly different types of mobile phones. The plug connectors may be accessible via e.g. a multi pull out wire rack with an automatic roll up mechanism, like on a gasoline pump.

Another advantageous coupling between the payment terminal and the second option is IR communication (IR=infrared radiation or light) wherein the coupling means or interface means of the payment terminal comprises an IR interface for communication with a corresponding IR interface of the mobile phone in order to exchange information or voice data information in the form of infrared signals between the payment terminal and the mobile phone. This is applicable on all newest mobile phone models which have, for instance, an IrDA interface. This option enables higher data rates and shorter transaction time.

Yet another advantageous option is RF communication (RF=radio frequency) wherein the coupling means or interface means of the payment terminal comprises a RF interface for communication with a corresponding RF interface of the mobile phone in order to exchange information or voice data information in the form of RF signals between the payment terminal and the mobile phone. Bluetooth and WLAN (Wireless Local Area Network ), for instance, are standards in this area, however other RF communication protocols are possible. The RF communication interface enables non contact transaction for highest user comfort.

In a preferred embodiment, the payment terminal device has data processing means which comprises at least a communication processor having cryptographic capability in order to generate data or to establish a data communication with high security due to secure coding of the data. The cryptographic capability may be of different types, such as DES, RSA, etc. With the two way connection the cryptographic capability of the payment terminal device may be reduces to a minimum. To prevent abuse, both channels between the payment terminal and the payment centre, the direct connection and the connection via the mobile phone, can be encrypted. An encryption may even be economised, if a random key is transferred via both connections to the payment terminal.

The payment terminal device of the invention can comprise data input means, such as at least one keyboard. The keyboard allows the user to select predefined services or to specify the amount for POS terminals. The Input means can be incorporated in the POS to integrally reduce the number of required interactions use the payment terminal. So in the case of an intelligent payment terminal, the acoustic coupler can in one action dial the number of the payment centre e.g. by DTMF (Dual Tone Multi Frequency Dialling), followed by the transfer of the required payment of for the transaction. Followed by the transfer of a confirmation from the payment centre to the payment terminal device or the POS, to initiate the release of the selected product.

The payment terminal device can comprise a printer or built-in printer in order, for instance, to print a confirmation of the actual payment procedure if the users want any.

The payment terminal device can have a display for showing the user, for instance, the different steps of the payment procedure or for giving him instructions on how to operate the payment terminal device. The terminal may be incorporated in the POS device, and may only be used from the payment terminal device, if a phone payment transaction is selected.

Further, the payment terminal device can comprise additional communication means, for instance a wireless communication modem, a wired communication modem such like a PSTN modem, an ISDN modem, cable modem or a GSM modem for coupling to the related networks in order to provide maintenance services etc.

Preferably, said payment terminal device comprises an interface to at least one point of sale device. So a single payment terminal device may be used with a number of vending machines or the like, to reduce the number of terminals required for rarely used point of sale devices.

According to another aspect of the present invention a point of sale device e.g. a vending machine with an integrated payment terminal as described in the preceding description is provided. The main advantage is that the interface to the vending machine may be economised. A second advantage is that an integrated payment terminal device can be better protected against damage and vandalism. An additional advantage is that modem vending machines and point of sale devices are connected to an electrical power supply. This can economise the an additional electrical power supply for the payment terminal device, and during installation, the communication connection or the second communication interface may be connected during installation.

The payment terminal device can be equipped with an additional connection to another computer system, such as a POS computer system or a payment protocol server, a user behaviour database, a maintenance server, or the like computer system.

There are a lot of applications which can be realised by means of the payment terminal device or the point of sale device of the invention. The invention can be used, for instance, in vending machines for various products, such as beverages, food, cigarettes, magazines, condoms, etc. Further, public self-service stations as POS stations, such as gas stations, photocopiers, Internet access, car washes, laundries, jukeboxes, carpools, etc., can use the payment terminal device of the invention. Also, various ticket purchasing stations for bus, train, cinema etc. can use the invention. Payment authorisation and execution for various shops (EFT-POS), Internet shopping, TV sales and other business, which use conventional billing methods for purchases, such as credit cards, bank cheques, cash, etc, can use the system or the payment terminal device of the invention.

Payment authorisation and execution has the additional advantage that for example cigarettes machines or drink dispensers can use the payment terminal device of the invention for a kind of age confirmation according to laws for the protection of young people. Vending machine interface can support industry-specific standards such as MDB and executive as well as its own native protocol, which can be used for connection to specific devices such as electronic cash registers, parking meters, taximeters, etc.

Further advantageous embodiments of the invention are mentioned in the dependent claims.

Figure 2:
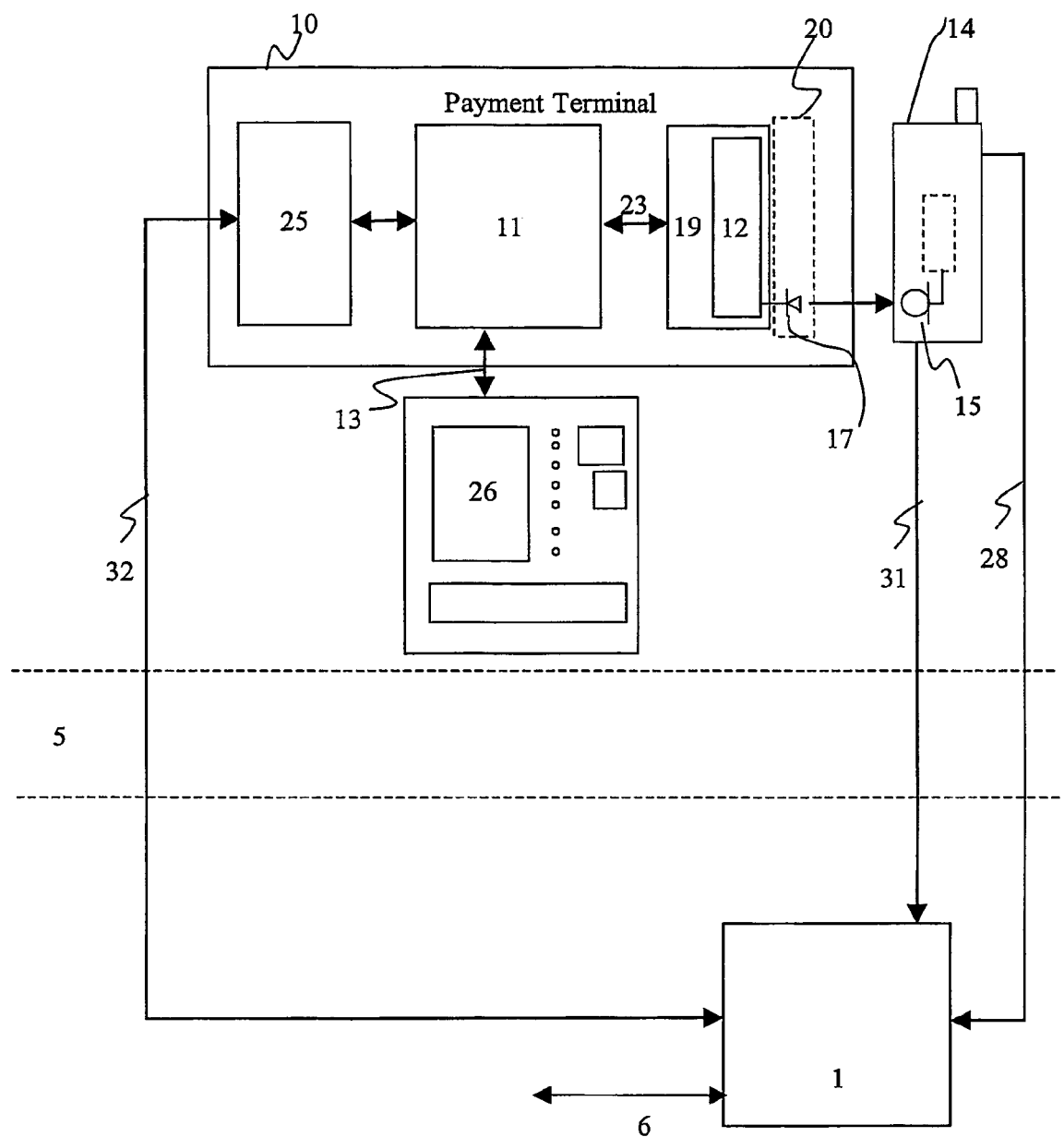

Further advantages, advantageous embodiments and additional applications of the invention are provided in the following description of a preferred embodiment of the invention in connection with the only figure being enclosed which shows:

FIG. 1 a schematic view of a system using a payment terminal device according to a preferred embodiment of the invention, and FIG. 2 is a schematic view of a system with a payment terminal device according to another embodiment of the present invention.

FIG. 1 shows an embodiment of the inventive system that comprises a payment centre authorisation centre 1 (an entity responsible for authentication, authorisation and corresponding payment and settlement procedures of the transaction) that is similar to those used for credit card authorisation and that may be connected by means of the data communication connection 6 to other financial information systems, such as a bank, a mobile voice network 5 or mobile telephone network, such as the GSM network, a mobile telephone 14 and a payment terminal device 10 to be coupled to the mobile telephone 14 of a user and to be connected via a data communication connection 13 to a point of sale station or means 26.

The payment centre 1 comprises communication interface for coupling the payment centre 1 to the mobile voice network 5, a subscriber database that stores data relating to each of the users, e.g. at least the telephone number, a corresponding PIN code and the agreed method of payment, e.g. from credit card, from bank-account etc., assigned to each of the users, and optionally a comprehensive CRM, i.e. the complete information on customer's purchases and thus the possibility of personalised services, advertising, etc., and again optionally the user's secret code, and a transaction interface that is connected by means of the data communication connection 6 to an other financial information system. A transaction interface can be connected to the communication interface by means of a bi-directional data connection. Further, a subscribers database can be connected to the transaction interface and to the communication interface by means of a data communication line.

The payment terminal device 10 comprises data processing means 11, interface means 19 being connected to the data processing means 11 by means of a mono- or bidirectional data communication line 23 or data bus, e.g. a serial or a parallel data connection, and being coupled to the mobile telephone 14 using voice as a carrier of information 24. The data processing means is based on a microcomputer system or a communication processor and is additionally connected to POS means or a request/release mechanism or unit of a POS means or vending machine 26 or similar apparatus by means of the data communication line or signal line 13.

The interface means 19 of the payment terminal device 10 comprises a modem 12 and coupling means 20 for coupling the modem 12 to the mobile phone 14. The coupling means 20 may use an acoustic coupling or an acoustic coupler using the microphone 17 in order to receive information using voice as a carrier from a loudspeaker 16 of the mobile telephone 14 that is attached or mounted to the acoustic coupler of the coupling means 20.

To be able to use the system of the invention the user has to own a mobile telephone 14 and the user has to set up a special account that belongs only to him in the payment centre 1. Preferably, the amount may be countable to a telephone bill or a prepaid count. The account set up is basically an agreement between the user and the payment centre 1, wherein both parties define the parameters of their co-operation. The parameters comprise one or more mobile phone numbers, e.g. SIM card numbers, the method of payment, e.g. money transfer, credit card, etc., optionally additional services which increase the security of both parties, e.g. transaction limits, security/authentication codes, etc., and optionally additional services which increase the flexibility of the user, e.g. multiple accounts, etc. The user could change the parameters of the agreement which are stored in a subscribers database of the payment centre 1 through user support services of the payment centre 1, through internet services, WAP and similar services. The authorisation centre can on request of the user or within the framework of its business policy assign to each user special identification code which is used not to reveal the mobile telephone number of the user to other involved parties and to grant the protection of the privacy of the user when participating in the system of invention.

Next, a typical payment procedure is described if the inventive system of FIG. 1 is used.

In a first step, the user decides to make a purchase at a cashier or device using the payment terminal device 10. The user uses his mobile phone 14 to call 28 the payment centre 1 via the mobile voice network 5.

In a second step the payment centre 1 uses the caller identity to establish and decide whether the caller is a registered user of the system. If the verification is not successful the payment centre 1 terminates the connection to the user or mobile phone 14 calling.

After the successful verification described in previous paragraph, the user is asked to input his security/authentication code, if the account parameters in the subscribers data base require authentication of the user. The user inputs the code by means of a keypad of the mobile telephone 14. In the next step, the payment centre 1 checks and compares the security/authentication code received from the mobile telephone 14 via the mobile voice network 5 to a security/authentication code stored in the subscribers data base. If the authentication is not successful (i.e. the entered code does not correspond to the code in the database) the payment centre 1 terminates the connection. If the authentication is successful the payment centre 1 instructs the user to put his mobile telephone 14 onto the acoustic coupler of the coupling means of the payment terminal device 10. The payment terminal device can shows the user information, for instance, on a display, on how to put the mobile telephone onto the acoustic coupler.

In the next step, the payment centre 1 transfers 30 the required transaction data or payment data via the voice channel established by the mobile telephone 14 to the payment centre. The transaction data can be coded by means of cryptographic capability implemented in the processing means 11 on the side of the payment terminal device 10 and in the communications interface in the payment centre 1. The processing means 11 controls the reception of transaction data on the side of the payment terminal device 10.

In the next step, the payment centre 1 verifies if the transaction data correspond to the specifications on the user's account (transaction limits . . . ) and approves or rejects the transaction via the a second direct connection 32 between the payment centre 1 and the payment terminal 11. If the transaction was approved by the payment centre 1, the payment terminal device 10 sends a signal or data generated by the processing means 11 via the connection 13 to the release mechanism or POS terminal 26, vending machine, etc. in order to release the paid goods or to approve a service being provided by these units or to display a visual approval if the sale is performed by a salesperson.

In summary, the payment terminal device 10 only includes a microphone 18. The microphone 18 is used to receive a transaction code from the payment centre 1. The code is used to pair the payment terminal data and user data that have been gathered from the phone 14. Authentication and payment authorisation is being done through an additional communication interface 25, preferably wireless such as GPRS or UMTS, or through a fixed line, such as ISDN, PSTN or similar. The terminal includes means to connect to a vending machine 26, electronic cash register or similar device that requires payment authorisation.

The payment is initiated by the phone 14 of the user, a call to the payment centre 1 is established 28. After identity and payment means has been chosen, the user is instructed to put the phone's speaker v16 (usually upper part of the handset) close to the microphone 18 of the terminal (which might be visually depicted). At the same time the centre start the transmission of transaction data which might be random (and might also be used for encryption/digital signature purposes). As soon as the terminal receives valid data it connects to the centre 1 through its second communication interface 25 sending it transaction data as the confirmation. At that point centre 1 ceases sending data though the phone 14 and starts payment authorisation through said second communication channel 32.

FIG. 2 depicts a schematic view of a system with a payment terminal device according to another embodiment of the invention. The embodiment of FIG. 2 is basically the same as in FIG. 1. As in FIG. 1, the interface means 19 of the payment terminal device 10 comprises a modem 12 and coupling means 20 for coupling the modem 12 to the mobile phone 14. In the present case, the modem 12 acts together with the loudspeaker 17 as an acoustic coupler. The difference to FIG. 1 is that the coupling means 20 may use an acoustic coupling or an acoustic coupler using the loudspeaker 17 in order to send information using voice as a carrier to a microphone 15 of the mobile telephone 14 that is attached or mounted to the acoustic coupler of the coupling means 20. So the payment device only includes a speaker 17 instead of the microphone 18. This "inverse" design only inverses the direction of the one-way data transmission between the speaker 17 of the payment device to the microphone 15 of the mobile phone, and of course the transmission direction 31 from the mobile phone to the payment center 1. The speaker would be used to send a very similar transaction code from the payment terminal device 11 to the payment centre 1, which would couple terminal data with session data of the user. However in such design, user could somehow (e.g. by pressing a button) invoke sending data through the speaker and of course put the microphone (not shown) of the mobile phone 14 (which location can vary significantly from one phone type to the other) close to said speaker. This may also be executed by e.g. a proximity sensor in the payment terminal device. The reference numerals in FIG. 2 which are not mentioned in the description of FIG. 2 are referring to the same elements as in the description of FIG. 1.

It is further to be noted that for the sake of fraud protection the payment terminal may be capable or arbitrary selecting the communication direction between the payment terminal device and the mobile telephone, to provide additional safety. It is further to be noted that the present invention does not need to alter the telephone in any way nor does it require to process anything else besides voice capabilities. The only prerequisite in the case of a personal identification number (PIN) -free solution is a network identification capability of the phone or the used mobile phone network.

It is further to be noted, that in the description the expression "modem" is used to describe electrical elements acting as a modulator/demodulator, for devices acting as modulators only and for devices acting as demodulators only. The expression modem has been chosen to be able to describe both embodiments of both figures with only one description, and only one set of claims. Devices using only modulators or demodulators in the payment device are intended to fall under the scope of the claims.

This application contains the description of implementations and embodiments of the present invention with the help of examples. It will be appreciated by a person skilled in the art that the present invention is not restricted to details of the embodiments presented above, and that the invention can also be implemented in another form without deviating from the characteristics of the invention. The embodiments presented above should be considered illustrative, but not restricting. Thus the possibilities of implementing and using the invention are only restricted by the enclosed claims. Consequently various options of implementing the invention as determined by the claims, including equivalent implementations, also belong to the scope of the invention.

The invention claimed is:

1. A payment terminal device for coupling to a point of sale device, and to a payment center, comprising:
   first interface means for coupling the payment terminal device to a mobile phone to transfer first data information between said payment terminal device and said payment center via said mobile phone and a voice channel between said mobile telephone and said payment center;
   second interface means for coupling said payment terminal device to said payment center, for transferring second data information between said payment terminal device and said payment center; and
   data processing means, coupled to said first and said second interface means, for processing data received from said payment center via said first and/or said second interface means and for generating data for transfer to said payment center via said first and/or said second interface means;
   wherein said first interface means comprises coupling means for coupling said first interface means to said mobile phone, for transferring the first data information between said processing means and said payment center via said first interface means, said mobile phone and said voice channel; and
   a modem, connected to said coupling means, for converting the first data information transferred via said first interface means into converted first data information;
   wherein said coupling means includes an acoustic coupler which provides the converted first data information as an output of sound data or acoustic data transmitted to the mobile terminal device;
   wherein the mobile phone senses the sound data or the acoustic data and transmits the sound data or the acoustic data to the payment center via said voice channel;
   wherein said second interface means comprises means for converting data transferred between said second interface means and said payment center into data for said processing means and said payment center and vice versa; and
   wherein the first and second interface means respectively transfer the first and second data information during the mobile phone and the payment terminal being utilized to make a payment by a user of the mobile phone at the payment center.

2. A payment terminal device according to claim 1, wherein said data transfer between said payment center and said payment terminal device via said mobile phone and said voice channel established by said mobile phone between said mobile telephone and said payment center is a one-way data transfer.

3. A payment terminal according to claim 1, wherein the acoustic coupler includes a microphone for coupling to a speaker of said mobile phone.

4. A payment terminal device according to claim 1, wherein the acoustic coupler includes a speaker for coupling to a microphone of said mobile phone.

5. A payment terminal device according to claim 3, wherein a distance between said microphone and said speaker is adjustable in order to adapt said acoustic coupler to different types of mobile phones.

6. A payment terminal device according to claim 1, wherein the data processing means comprises at least a communication processor having cryptographic capability.

7. A payment terminal device according to claim 1, wherein the payment terminal device comprises data input means.

8. A payment terminal device according to claim 7, wherein the data input means comprises at least one keyboard.

9. A payment terminal device according to claim 1, wherein the payment terminal device comprises a printer.

10. A payment terminal device according to claim 1, wherein the payment terminal device comprises a display.

11. A payment terminal device according to claim 1, wherein the payment terminal device comprises an interface to a vending machine.

12. A point of sale device, including an integrated payment terminal according to claim 1.

13. A payment system comprising:
a point of sale device with an integrated payment terminal device, a payment center, a mobile phone and mobile cellular telephone network;
said mobile phone being connected to said payment center via a voice channel of said mobile cellular telephone network;
said payment center and said payment terminal being connected via a direct connection;
the payment terminal device including:
a first interface means for coupling the payment terminal device to a mobile phone to transfer first data information between said payment terminal device and said payment center via said mobile phone and a voice channel established between said mobile phone and said payment center;
second interface means for coupling said payment terminal device to said payment center, for transferring second data information between said payment terminal device and said payment center; and
data processing means, coupled to said first and said second interface means, for processing data received from said payment center via said first and/or said second interface means and for generating data for transmission to said payment center via said first and/or said second interface means;
wherein said first interface means comprises coupling means for coupling said first interface means to said mobile phone, for transferring the first data information between said processing means and said payment center via said first interface means, said mobile phone and said voice channel; and
a modem, connected to said coupling means, for converting the first data information transferred via said first interface means into converted first data information;
wherein said coupling means includes an acoustic coupler which provides the converted first data information as an output of sound data or acoustic data transmitted to the mobile terminal device;
wherein the mobile phone senses the sound data or the acoustic data and transmits the sound data or the acoustic data to the payment center via said voice channel;
wherein said second interface means comprises means for converting data transferred between said second interface means and said payment center into data for said processing means and said payment center and vice versa; and
wherein the first and second interface means respectively transfer the first and second data information during the mobile phone and the payment terminal being utilized to make a payment by a user of the mobile phone at the payment center.

14. A payment terminal device according to claim 2, wherein the data processing means comprises at least a communication processor having cryptographic capability.

15. A payment terminal device in accordance with claim 1 wherein:
the first data information generated by the data processing means for transfer to said payment center comprises at least one of transaction data and payment data which are output by the acoustic coupler through an air gap to the mobile phone as the sound data or the acoustic data and from the mobile phone by the voice channel of the mobile cellular network to the payment center.

16. A payment system in accordance with claim 13 wherein:
the first data information generated by the data processing means for transfer to said payment center comprises at least one of transaction data and payment data which are output by the acoustic coupler through an air gap to the mobile phone as the sound data or the acoustic data and from the mobile phone by the voice channel of the mobile cellular network to the payment center.

17. A payment terminal in accordance with claim 15 wherein:
the payment center processes the converted first data information and sends the second data information to the second interface approving or rejecting a transaction requested by a user of the mobile phone.

18. A payment terminal in accordance with claim 16 wherein:
the payment center processes the converted first data information and sends the second data information to the second interface approving or rejecting a transaction requested by a user of the mobile phone.

* * * * *